(12) United States Patent
Shibata et al.

(10) Patent No.: US 12,484,792 B2
(45) Date of Patent: Dec. 2, 2025

(54) BIOLOGICAL INFORMATION DETECTOR

(71) Applicant: DENSO CORPORATION, Kariya (JP)

(72) Inventors: Syunsuke Shibata, Nisshin (JP);
Takashi Saito, Nisshin (JP); Goro Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 18/353,395

(22) Filed: Jul. 17, 2023

(65) Prior Publication Data

US 2023/0355111 A1 Nov. 9, 2023

Related U.S. Application Data

(63) Continuation of application No. PCT/JP2022/002003, filed on Jan. 20, 2022.

(30) Foreign Application Priority Data

Jan. 27, 2021 (JP) ................................. 2021-011244

(51) Int. Cl.
*A61B 5/021* (2006.01)
*A61B 5/00* (2006.01)
*A61B 5/05* (2021.01)

(52) U.S. Cl.
CPC ................ *A61B 5/021* (2013.01); *A61B 5/05* (2013.01); *A61B 5/6893* (2013.01); *A61B 2503/22* (2013.01)

(58) Field of Classification Search
None
See application file for complete search history.

(56) References Cited

U.S. PATENT DOCUMENTS

| | | | |
|---|---|---|---|
| 2007/0016085 A1 | 1/2007 | Inukai et al. | |
| 2015/0073230 A1 | 3/2015 | Stergiou | |
| 2015/0126820 A1 | 5/2015 | Muhlsteff | |
| 2016/0029908 A1 | 2/2016 | Usuda et al. | |

(Continued)

FOREIGN PATENT DOCUMENTS

| | | |
|---|---|---|
| CN | 110573069 A | 12/2019 |
| JP | H07308295 A | 11/1995 |

(Continued)

*Primary Examiner* — Yi-Shan Yang
(74) *Attorney, Agent, or Firm* — Harness, Dickey & Pierce, P.L.C.

(57) ABSTRACT

A biological information detector detects biological information of an object person. The biological information detector includes a reception antenna that receives radio waves transmitted from a transmission antenna through the object person, and a signal acquisition unit that acquires a reception signal corresponding to a radio wave received by the reception antenna when the radio waves are transmitted from the transmission antenna. The biological information detector further includes a calculation unit that calculates the biological information based on the received signal acquired by the signal acquisition unit. The calculation unit extracts a signal component generated due to movement of a heart of the object person based on the received signal, and calculates a blood pressure of the object person as the biological information based on the signal component.

7 Claims, 6 Drawing Sheets

(56) References Cited

U.S. PATENT DOCUMENTS

| | | | |
|---|---|---|---|
| 2016/0100766 A1* | 4/2016 | Yoshioka | A61B 5/0082 |
| | | | 600/301 |
| 2018/0042499 A1 | 2/2018 | Sato | |
| 2018/0228383 A1 | 8/2018 | Warisawa et al. | |
| 2019/0350458 A1* | 11/2019 | Rosero | A61L 27/3604 |
| 2020/0129084 A1 | 4/2020 | Suzuki | |
| 2021/0015442 A1* | 1/2021 | Barnacka | G16H 40/67 |

FOREIGN PATENT DOCUMENTS

| | | | |
|---|---|---|---|
| JP | 2006006897 A | 1/2006 | |
| JP | 2007007075 A | 1/2007 | |
| JP | 2012016450 A | 1/2012 | |
| JP | 2015054237 A | 3/2015 | |
| JP | 2015519940 A | 7/2015 | |
| JP | 2016032488 A | 3/2016 | |
| JP | 2016077890 A | 5/2016 | |
| JP | 2016159081 A | 9/2016 | |
| JP | 2018130319 A | 8/2018 | |
| JP | 2021-003245 A | 1/2021 | |

\* cited by examiner

BIOLOGICAL INFORMATION DETECTOR

CROSS REFERENCE TO RELATED APPLICATIONS

The present application is a continuation application of International Patent Application No. PCT/JP2022/002003 filed on Jan. 20, 2022, which designated the U.S. and claims the benefit of priority from Japanese Patent Application No. 2021-011244 filed on Jan. 27, 2021. The entire disclosures of all of the above applications are incorporated herein by reference.

TECHNICAL FIELD

The present disclosure relates to a biological information detector that detects biological information of an object person.

BACKGROUND

A blood pressure measurement device measures a blood pressure of an object person based on an output from a pulse wave sensor attached to the object person.

SUMMARY

According to at least one embodiment, a biological information detector includes a reception antenna that receives radio waves transmitted from a transmission antenna through the object person, a signal acquisition unit that acquires a reception signal corresponding to a radio wave received by the reception antenna when the radio waves are transmitted from the transmission antenna, and a calculation unit that calculates the biological information based on the received signal acquired by the signal acquisition unit. The calculation unit extracts a signal component generated due to movement of a heart of the object person based on the received signal, and calculates a blood pressure of the object person as the biological information based on the signal component.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
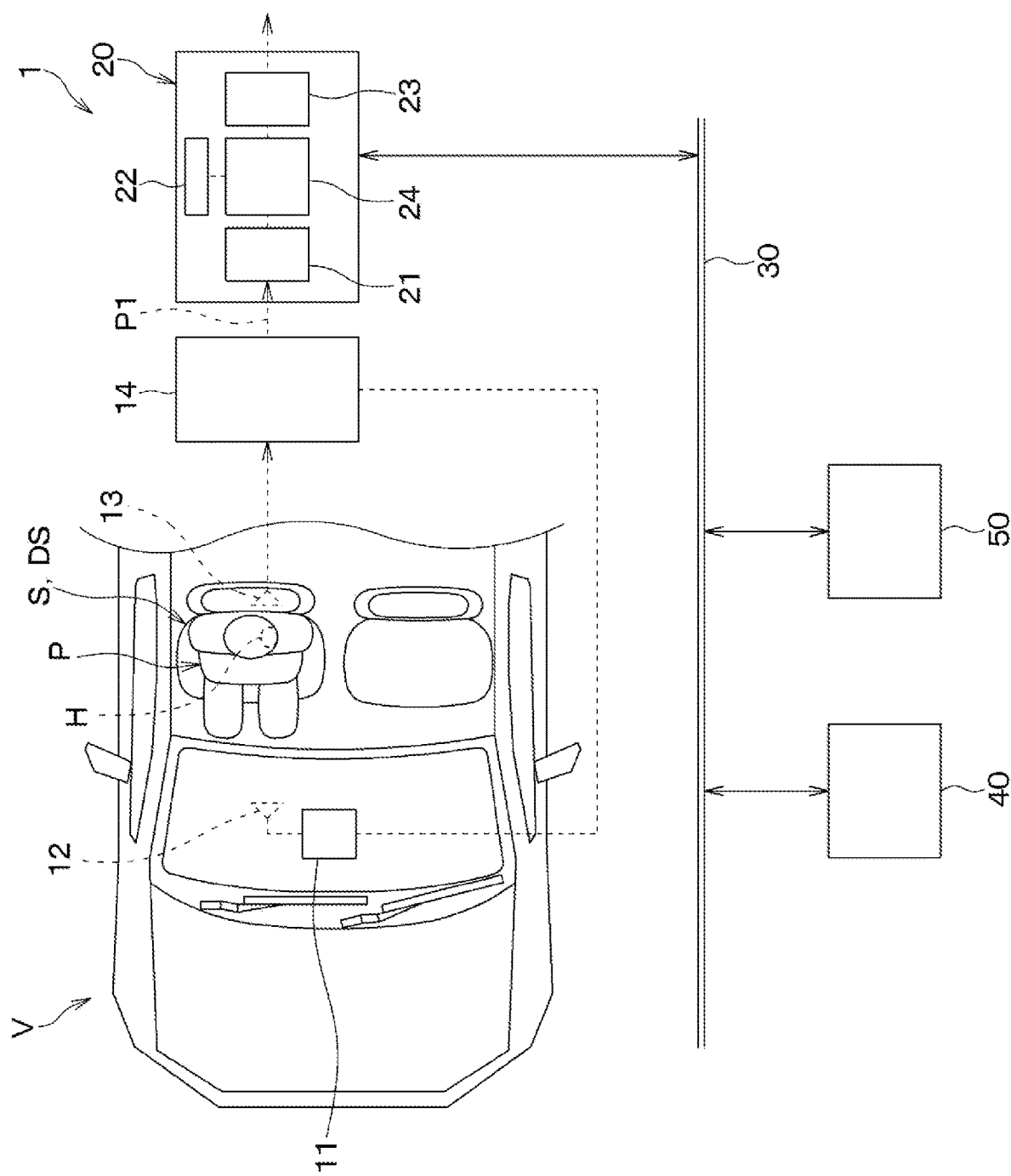
FIG. 1 is a schematic diagram showing a biological information detector in the first embodiment.

To begin with, examples of relevant techniques will be described.

A blood pressure measurement device according to a comparative example measures a blood pressure of an object person based on an output from a pulse wave sensor attached to the object person. The blood pressure measurement device calculates a pulse transit time based on an acceleration pulse wave obtained by differentiating twice a pulse wave detected by a pulse wave sensor, and calculates a blood pressure value based on the pulse transit time.

However, in the comparative example, the pulse wave sensor needs to be attached to the object person, and the pulse wave sensor may hinder actions of the object person when detecting the blood pressure of the object person.

In contrast to the comparative example, according to a biological information detector of the present disclosure, a blood pressure of an object person can be detected while decreasing hindrance of actions of the object person.

According to an aspect of the present disclosure, a biological information detector includes a reception antenna that receives radio waves transmitted from a transmission antenna through the object person, a signal acquisition unit that acquires a reception signal corresponding to a radio wave received by the reception antenna when the radio waves are transmitted from the transmission antenna, and a calculation unit that calculates the biological information based on the received signal acquired by the signal acquisition unit. The calculation unit extracts a signal component generated due to movement of a heart of the object person based on the received signal, and calculates a blood pressure of the object person as the biological information based on the signal component.

According to this, since a body of the object person is not restrained, the biological information detector is capable of measuring the blood pressure of the object person while decreasing hindrance of actions of the object person.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

The present embodiment will be described with reference to FIGS. 1 to 6. In the present embodiment, an example in which biological information of an occupant P seated on seats S of a vehicle V is calculated using a biological information detector 1 of the present disclosure will be described.

In recent years, emphasis has been placed on preventive medicine that prevents diseases from occurring through daily health management, rather than treatment after symptoms of a disease have appeared. Blood pressure is an index used for the daily health management. The blood pressure is one of indexes for measuring a degree of strain on a heart H, and is an essential item in medical checkups in Japan. However, since the blood pressure varies depending on a measurement time, a meal before measurement, or tension, it is recommended to measure blood pressure not only at a place of a health checkup once a year but also at the same time once a day, for example, and to observe a transition thereof. One place considered suitable for the environment is a commuting time using the vehicle V. However, since there is a condition of "not hindering driving" as a condition when riding in the vehicle V, it is difficult to use a wearing type or a cuff type, and it is required to detect the blood pressure without restraint.

In consideration of these, the biological information detector 1 is a radio wave transmission type device that detects the biological information of the occupant P based on a radio wave signal transmitted through the occupant P. The biological information detector 1 sets the occupant P seated in a driver's seat DS in seats S of the vehicle V as an object person, and calculates the blood pressure of the object person as the biological information. The biological information detector 1 includes a transmitter 11, a transmission antenna 12, a reception antenna 13, a receiver 14, and an information controller 20.

The transmitter 11 outputs a transmission signal having a predetermined frequency (for example, a frequency in a 900 MHz band) to the transmission antenna 12. The transmission antenna 12 is arranged at a frontward in a traveling direction of the vehicle V from the driver's seat DS in an instrument panel in the vehicle V. The transmission antenna 12 transmits a radio wave signal corresponding to the transmission signal from the transmitter 11 toward an upper body of the occupant P seated on the driver's seat DS.

Figure 2:
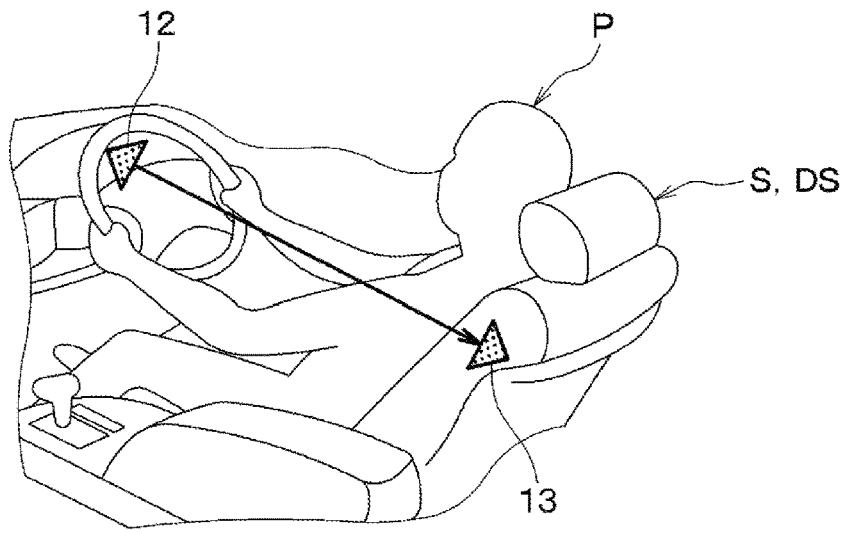
FIG. 2 is a schematic diagram showing an example of an arrangement of a transmission antenna and a reception antenna.

As shown in FIG. 2, the reception antenna 13 is arranged facing the transmission antenna 12, and the occupant P seated on the driver's seat DS is interposed between the reception antenna 13 and the transmission antenna 12. The reception antenna 13 of the present embodiment is attached to a seat back of the driver's seat DS. The reception antenna 13 is capable of receiving radio waves transmitted from the transmission antenna 12. The reception antenna 13 receives the radio wave transmitted from the transmission antenna 12 through the occupant P who is the object person.

The receiver 14 amplifies and outputs the radio wave signal received by the reception antenna 13. More specifically, the receiver 14 amplifies the radio wave signal received by the reception antenna 13 and outputs the amplified signal as a biological signal P1 to the information controller 20.

The information controller 20 calculates the blood pressure of the occupant P based on the biological signal P1 acquired from the receiver 14. The information controller 20 includes an input unit 21, a storage unit 22, an output unit 23, and a processing unit 24.

The input unit 21 is a signal acquisition unit that acquires a reception signal corresponding to a radio wave received by the reception antenna 13 when the radio wave is radiated from the transmission antenna 12. The input unit 21 outputs the biological signal P1, which is an analog signal input from the receiver 14, to the processing unit 24 as a digital signal.

The storage unit 22 includes a random access memory (i.e., RAM), a read only memory (i.e., ROM), a writable nonvolatile storage medium, and the like. The RAM, the ROM, and the writable nonvolatile storage medium constituting the storage unit 22 are all non-transitory tangible storage medium.

The output unit 23 outputs a signal input from the processing unit 24 to a device outside the information controller 20. The device outside the information controller 20 may be, for example, an in-vehicle navigation device that performs route guidance, an in-vehicle data communication module that communicates with an outside of the vehicle V, or a mobile communication terminal carried by the occupant P.

The processing unit 24 executes processing in accordance with a program recorded in the ROM of the storage unit 22 or a writable nonvolatile storage medium. The processing unit 24 of the present embodiment uses the RAM of the storage unit 22 as a work area. The processing unit 24 functions as a calculation unit that calculates the biological information based on the reception signal acquired by the input unit 21.

The information controller 20 is connected to an in-vehicle network via CAN communication. CAN is an abbreviation of Controller Area Network. The information controller 20 is connected to a CAN bus 30 which is a communication bus. In-vehicle devices such as a seat controller 40 and an in-vehicle detection device 50 are connected to the CAN bus 30. The information controller 20 is capable of acquiring seat information stored in the seat controller 40, and a detection result of the in-vehicle detection device 50 via the CAN bus 30.

The seat controller 40 adjusts a position of the seats S by moving the seats S forward and backward of the vehicle V. The seat controller 40 includes an actuator that drives the seats S, a controller that controls the actuator, and a storage medium (not shown). The storage medium is a non-volatile storage medium for storing the seat information such as a front-rear position of the seats S. The storage medium is a non-transitory tangible storage medium. The seat controller 40 is connected to the CAN bus 30.

The in-vehicle detection device 50 is capable of detecting posture of the object person in the vehicle. The in-vehicle detection device 50 includes, for example, an imaging device for vehicle interior monitoring, an infrared sensor that detects a temperature change in the vehicle interior, or the like. The in-vehicle detection device 50 is connected to the CAN bus 30.

Next, an operation of the biological information detector 1 will be described. The transmitter 11 outputs a transmission signal of a predetermined frequency to the transmission antenna 12. The transmission antenna 12 transmits a radio wave corresponding to the transmission signal from the transmitter 11 toward the occupant P on the driver's seat DS. A part of the radio wave transmitted from the transmission antenna 12 is transmitted through the occupant P in the driver's seat DS, and is received by the reception antenna 13.

A body of the occupant P functions as a dielectric in response to the radio waves. Therefore, when the radio wave passes through the body of the occupant P, a dielectric loss occurs in an electric field intensity of the radio wave. A shape of a heart H in the body of the occupant P changes with expansion and contraction of the heart H. Therefore, in the radio wave transmitted through the heart H and reaching the reception antenna 13, the dielectric loss generated in the electric field intensity changes according to a movement of the heart H.

As described above, strength of the reception signal received by the reception antenna 13 includes a component that periodically changes in accordance with the movement of the heart H. Therefore, a level of the electrical signal output from the reception antenna 13 to the receiver 14 when the reception antenna 13 receives the radio wave from the transmission antenna 12 includes a component that varies according to the movement of the heart H.

Figure 3:
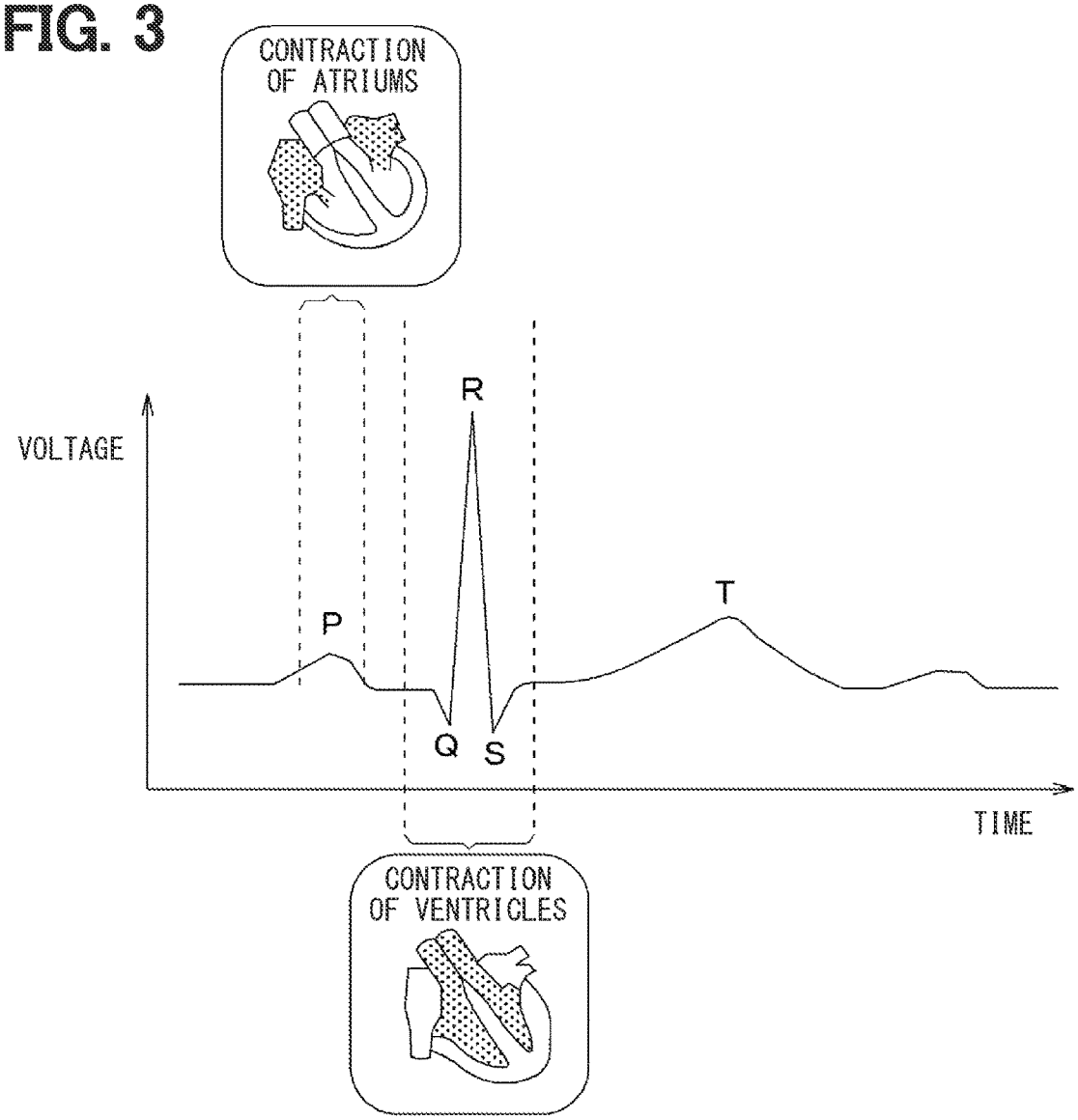
FIG. 3 is an explanatory diagram for explaining electrocardiogram data.

FIG. 3 shows electrocardiogram data in which a horizontal axis represents time and a vertical axis represents amplitude of a waveform of the electrocardiogram. The electrocardiogram data is recording data of electric energy generated when the heart H contracts. The motion of the heart H is reflected in the electrocardiogram data. That is, the electrocardiogram data includes a component that varies according to the motion of the heart H. More specifically, as shown in FIG. 3, the contraction of atriums of the heart H corresponds to a P wave of the electrocardiogram. The contraction of ventricles of the heart H corresponds to the QRS wave following the P wave. A voltage of the QRS wave is higher than a voltage of the P wave.

In the heart H, since the contraction of the atriums and the contraction of the ventricles are repeated, blood entering from the atriums is pushed out to the ventricles and is sent out from the ventricles to an outside of the heart H. More specifically, blood is pumped from a right ventricle to lungs and from a left ventricle to a whole body. Therefore, a contraction amount of the left ventricle is proportional to an ejection amount of blood delivered from the heart H to the whole body. The blood pressure changes according to the ejection amount of blood delivered from the heart H to the whole body and a vascular resistance. Therefore, there is a certain correlation between the blood pressure and the movement of the heart H.

Figure 4:
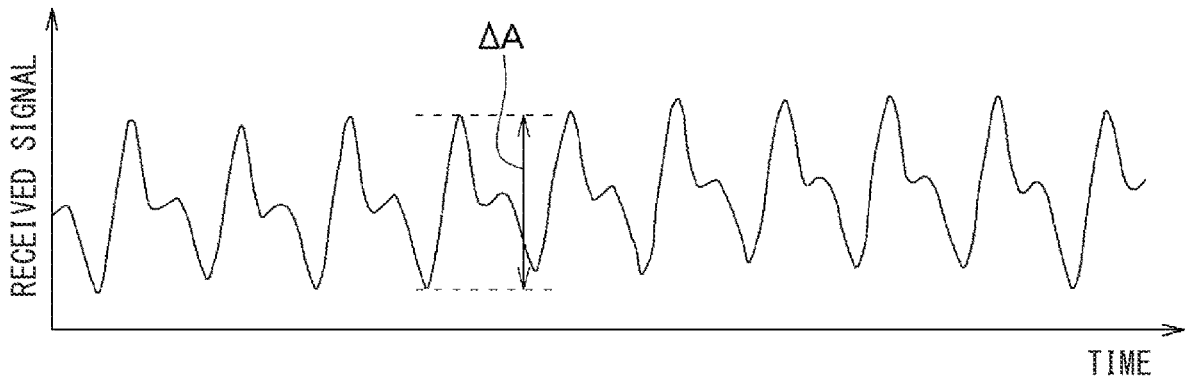
FIG. 4 is an explanatory diagram for explaining a time waveform of a reception signal.

An intensity of the reception signal received by the reception antenna 13 of the biological information detector 1 changes according to the movement of the heart H, similarly to the electrocardiogram data. The motion of the heart H includes two stages of motion of the atrium and the ventricle. Correspondingly, as shown in FIG. 4, the time waveform of the reception signal varies in two stages of signal strength. According to research and study by the present inventors, the research shows that a change in signal strength of a reception signal increases when the ventricle contracts. More specifically, a contraction amount of the ventricles of the heart H has a strong correlation with a largest change amount $\Delta A$ of the signal strength of the reception signal.

In consideration of these, in the biological information detector 1 of the present embodiment, a characteristic change amount among changes in the signal strength of the reception signal in a predetermined period is extracted as a component caused by contraction of the ventricles of the heart H, and the blood pressure of the object person is calculated based on the component.

Hereinafter, a flow of processes executed by the processing unit 24 of the information controller 20 will be described with reference to FIG. 5. The processes showing in FIG. 5 is periodically or irregularly executed by the information controller 20 in a state where the occupant P is seated on the driver's seat DS of the vehicle V.

Figure 5:
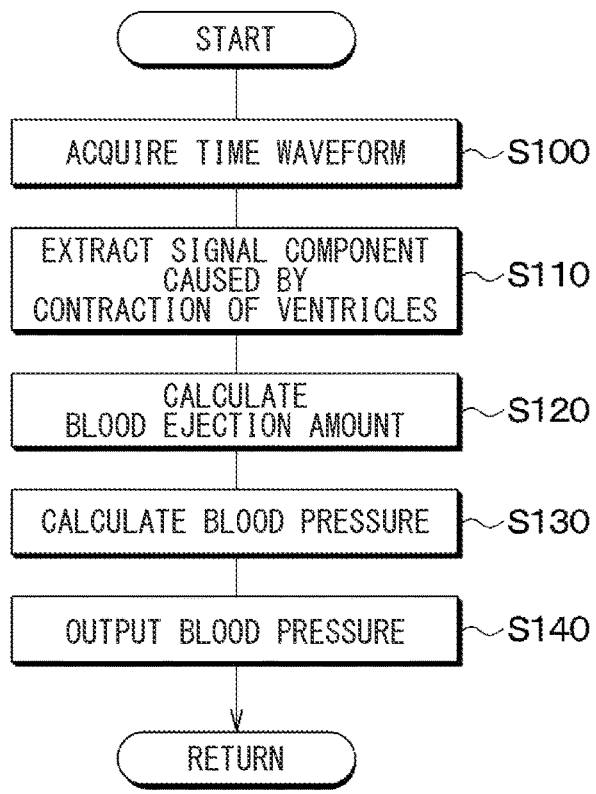
FIG. 5 is a flowchart showing a flow of a control process executed by an information controller of the biological information detector according to the first embodiment.

As shown in FIG. 5, in step S100, the processing unit 24 acquires, via the receiver 14, the time waveform of the reception signal received by the reception antenna 13 when the radio wave is transmitted from the transmission antenna 12. The time waveform of the reception signal is a change over time in the signal strength of the reception signal. The time waveform is, for example, a waveform as shown in FIG. 4. The time waveform includes a component having a correlation with the motion of the ventricles of the heart H.

Subsequently, in step S110, the processing unit 24 extracts a signal component caused by the contraction of the ventricles from the received signal. As described above, the contraction amount of the ventricles of the heart H has a strong correlation with the largest change amount $\Delta A$ of the signal strength of the reception signal. Therefore, the processing unit 24 extracts the largest change amount $\Delta A$ among changes in the signal strength of the reception signal in the predetermined period as a characteristic change amount.

Subsequently, in step S120, the processing unit 24 calculates a blood ejection amount based on the largest change amount $\Delta A$. More specifically, the processing unit 24 calculates the blood ejection amount based on the largest change amount $\Delta A$ extracted in step S120 with reference to a control map or a relational expression that defines the relationship between the largest change amount $\Delta A$ and the blood ejection amount. The control map or the relational expression defining the relationship between the largest change amount $\Delta A$ and the blood ejection amount can be created, for example, by synchronously acquiring an echo image in which the contraction amount of the ventricles proportional to the blood ejection amount can be grasped and the reception signal of the reception antenna 13.

Subsequently, in step S130, the processing unit 24 calculates the blood pressure of the object person based on the blood ejection amount. More specifically, the processing unit 24 calculates the blood pressure of the object person based on the blood ejection amount calculated in step S120 with reference to a control map or a relational expression that defines a relationship between the blood ejection amount and the blood pressure. The control map or the relational expression that defines the relationship between the blood ejection amount and the blood pressure can be created, for example, based on a measurement result at a time of a medical examination.

Subsequently, in step S140, the processing unit 24 outputs the blood pressure calculated in step S130 from the output unit 23 to a device outside the biological information detector 1. For example, the processing unit 24 may output the blood pressure to a driver status monitor DSM that detects an arousal level or the like of the occupant P.

The processing unit 24 of the biological information detector 1 described above extracts the signal component generated due to the movement of the heart H of the object person based on the reception signal corresponding to the radio wave transmitted through the body of the object person, and calculates the blood pressure of the object person as the biological information based on the signal component. According to this, since the body of the object person is not restrained, the biological information detector 1 is capable of measuring the blood pressure of the object person while decreasing hindrance of actions of the object person.

(1) The processing unit 24 of the present embodiment extracts the characteristic change amount among the changes in the signal strength of the reception signal in the predetermined period as the signal component generated due to contraction of the ventricles of the heart H, and calculates the blood ejection amount delivered from the heart H to the whole body based on the signal component. According to this, the blood ejection amount having the strong correlation with the blood pressure can be calculated.

The blood ejection amount is one of indices for evaluating a function of the heart H together with the blood pressure, and is usually measured using an ultrasonic sensor instead of a pulse sensor. The biological information detector 1 of the present embodiment has an advantage in that each of the blood pressure and the blood pressure ejection amount can be calculated by a single device.

(2) More specifically, the processing unit 24 calculates the largest change amount ΔA of the signal strength of the reception signal in the predetermined period as the characteristic change amount. As described above, when the blood ejection amount is calculated based on the largest change amount ΔA among the changes in the signal strength of the reception signal in the predetermined period, the blood ejection amount can be accurately calculated based on the signal component generated due to the contraction of the ventricles having the strong correlation with the blood ejection amount.

Modification to the First Embodiment

Figure 6:
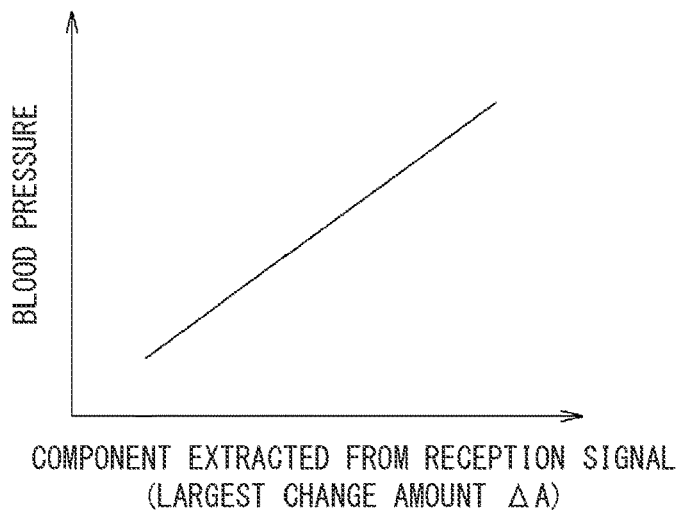
FIG. 6 is an explanatory diagram for explaining a correlation between a variation amount of a component extracted from a reception signal and blood pressure.

The biological information detector 1 of the first embodiment calculates the blood ejection amount based on the characteristic change amount of the signal strength of the reception signal, but a calculation method is not limited to this method. As shown in FIG. 6, the characteristic change amount of the signal strength of the reception signal has a strong correlation with the blood pressure. More specifically, the largest change amount ΔA of the signal strength of the reception signal in the predetermined period is substantially proportional to the blood pressure. Therefore, the biological information detector 1 may calculate the blood pressure based on the characteristic change amount in the reception signal. The same applies to the following embodiments.

Second Embodiment

Figure 7:
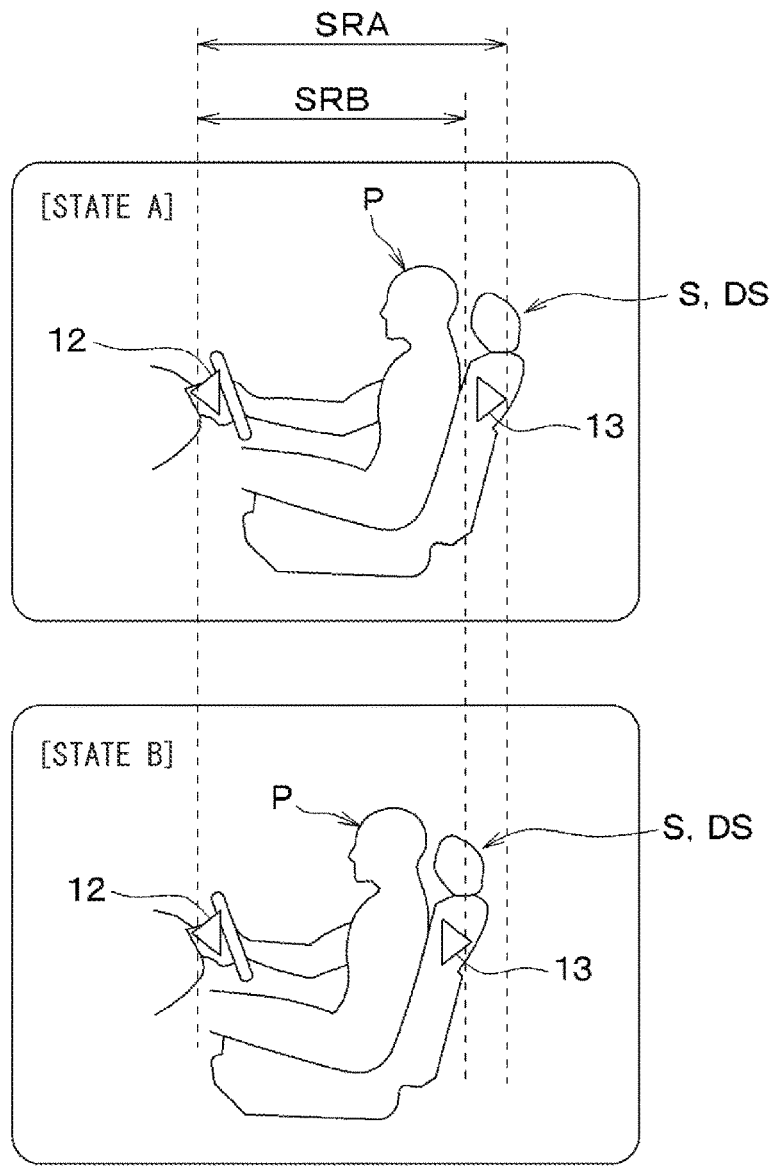
FIG. 7 is a schematic diagram showing a change in a positional relationship between the transmission antenna and the reception antenna when a seat position changes.

Next, a second embodiment will be described with reference to FIGS. 7 to 9. In the present embodiment, differences from the first embodiment will be mainly described.

In a biological information detector 1, as a distance from a transmission antenna 12 to a reception antenna 13 decreases, a signal strength received by the reception antenna 13 increases. Therefore, when a position of seats S on which an occupant P, who is the object person, is seated changes back and forth, a positional relationship between the object person, the reception antenna 13, and the transmission antenna 12 changes, and radio waves received by the reception antenna 13 change. For example, as shown in FIG. 7, when a state of the seats S changes from a state A to a state B, the distance from the transmission antenna 12 to the reception antenna 13 decreases, and thus the signal strength received by the reception antenna 13 increases. In consideration of these, a processing unit 24 of the present embodiment calculates the blood pressure of the object person based on the received signal and the position of the seats S.

Hereinafter, a flow of processes executed by the information controller 20 of the biological information detector 1 will be described with reference to FIG. 8. The processes shown in FIG. 8 corresponds to the processes shown in FIG. 5 described in the first embodiment.

Figure 8:
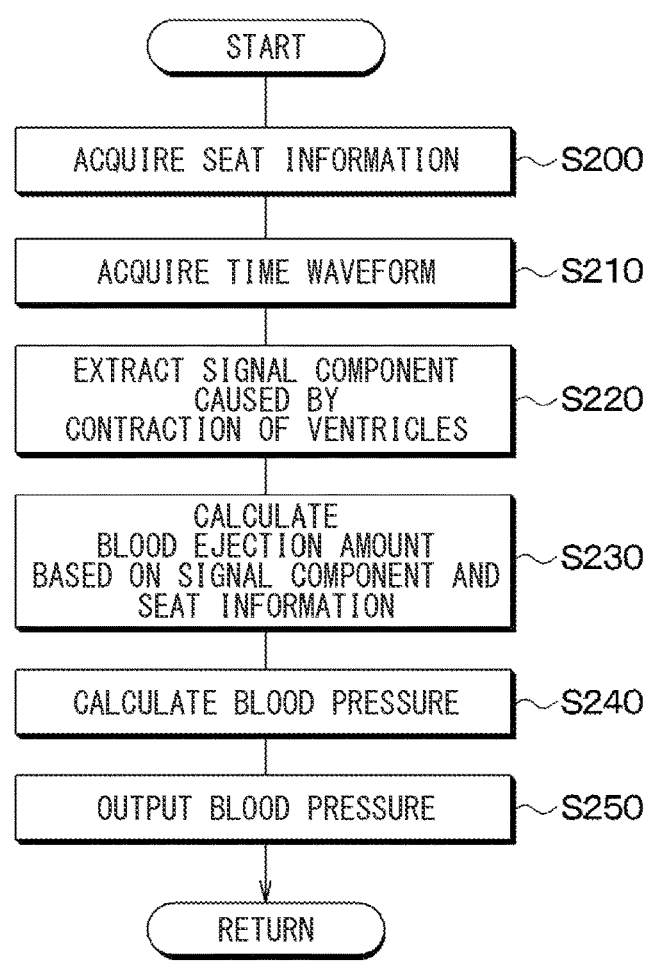
FIG. 8 is a flowchart showing a flow of a control process executed by an information controller of a biological information detector according to a second embodiment.
Figure 9:
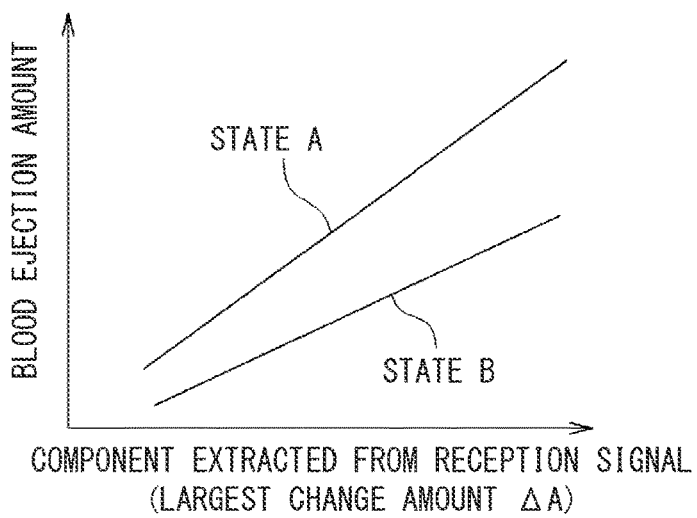
FIG. 9 is an explanatory diagram for explaining a relationship between a variation amount of a component extracted from a reception signal and a blood pressure when a seat position changes.

As shown in FIG. 8, in step S200, the processing unit 24 acquires seat information including the position of the seats S. More specifically, the processing unit 24 acquires the seat information from a seat controller 40 via a CAN bus 30.

In step S210, the processing unit 24 acquires, via the receiver 14, a time waveform of a reception signal received by the reception antenna 13 when the radio wave is transmitted from the transmission antenna 12. Then, in step S220, the processing unit 24 extracts a signal component caused by contraction of ventricles from the received signal. More specifically, the processing unit 24 extracts a largest change amount ΔA from changes in the signal strength of the reception signal in a predetermined period as a characteristic change amount.

Subsequently, in step S230, the processing unit 24 calculates blood ejection amount based on the largest change amount ΔA and the seat information. The processing unit 24 of the present embodiment calculates the blood ejection amount based on the largest change amount ΔA extracted in step S120 with reference to a control map or a relational expression that defines a relationship between the largest change amount ΔA and the blood ejection amount for each position of the seats S. More specifically, a control map or a relational expression corresponding to the position of the seats S is specified, and the blood ejection amount is calculated based on the largest change amount ΔA with reference to the specified control map or relational expression. For example, as shown in FIG. 9, the control map or the relational expression defining the relationship between the largest change amount ΔA and the blood ejection amount is set such that the blood ejection amount corresponding to the largest change amount ΔA decreases as the distance from the transmission antenna 12 to the reception antenna 13 decreases. The control map is set such that change amount of the blood ejection amount with respect to an increase or decrease of the largest change amount ΔA decreases as the distance from the transmission antenna 12 to the reception antenna 13 decreases.

Subsequently, in step S240, the processing unit 24 calculates the blood pressure of the object person based on the blood ejection amount. Then, in step S250, the processing unit 24 outputs the blood pressure calculated in step S240 from an output unit 23 to a device outside the biological information detector 1.

Others are the same as those in the first embodiment. The biological information detector 1 of the present embodiment can achieve effects obtained from the common configuration or the equivalent configuration to the first embodiment.

(1) When the position of the seats S on which the object person sits changes, the positional relationship among the object person, the reception antenna 13, and the transmission antenna 12 may change, and the radio waves received by the reception antenna 13 may change. Therefore, as described above, the processing unit 24 may calculate the blood pressure of the object person based on the received signal and the position of the seats S.

Modification of Second Embodiment

The processing unit 24 of the second embodiment acquires the seat information including the position of the seats S from the seat controller 40, but is not limited to the seat controller 40, and may acquire information on the position of the seats S from another device, for example, the in-vehicle detection device 50 or the like.

The processing unit 24 of the second embodiment calculates the blood ejection amount based on the largest change amount ΔA with reference to a control map or a relational expression that defines a relationship between the largest change amount ΔA and the blood ejection amount for each position of the seats S, but the processing unit 24 is not limited this method. For example, the processing unit 24 may correct the largest change amount ΔA according to the position of the seats S. More specifically, the processing unit 24 may perform correction to reduce the largest change amount ΔA as the position of the seats S is located forward.

Third Embodiment

Next, a third embodiment will be described with reference to FIGS. 10 and 11. In the present embodiment, differences from the first embodiment will be mainly described.

Figure 10:
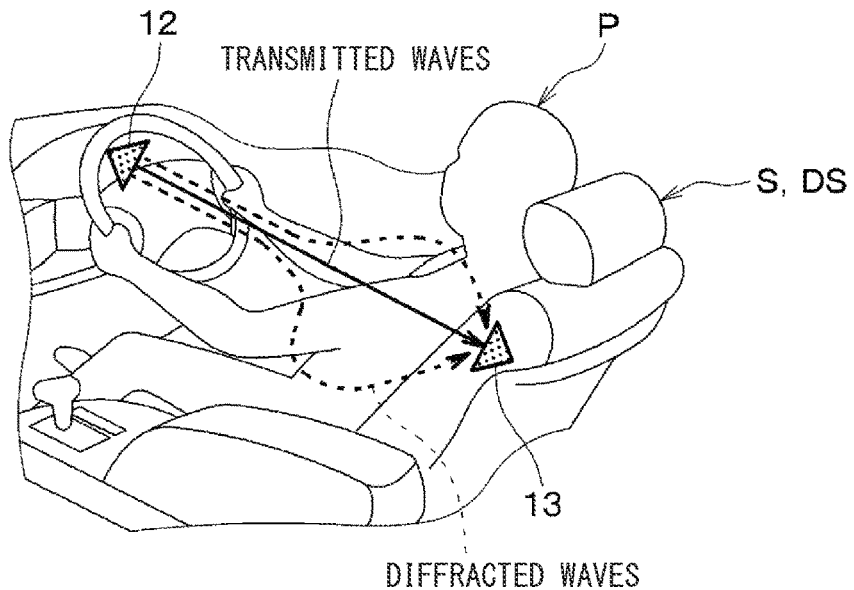
FIG. 10 is an explanatory diagram for explaining radio waves received by the reception signal.

As shown in FIG. 10, a reception antenna 13 receives not only radio waves (that is, transmitted waves) radiated from a transmission antenna 12 and transmitted through an occupant P but also radio waves (that is, diffracted waves) propagating around the occupant P by diffraction. When a posture of the occupant P as an object person changes, the transmitted waves and the diffracted waves change, and thus the radio waves received by the reception antenna 13 changes. In consideration of these, a processing unit 24 of the present embodiment calculates a blood pressure of the object person based on a received signal and the posture of the object person.

Hereinafter, a flow of processes executed by the information controller 20 of a biological information detector 1 will be described with reference to FIG. 11. The processes shown in FIG. 11 corresponds to the processes shown in FIG. 5 described in the first embodiment.

Figure 11:
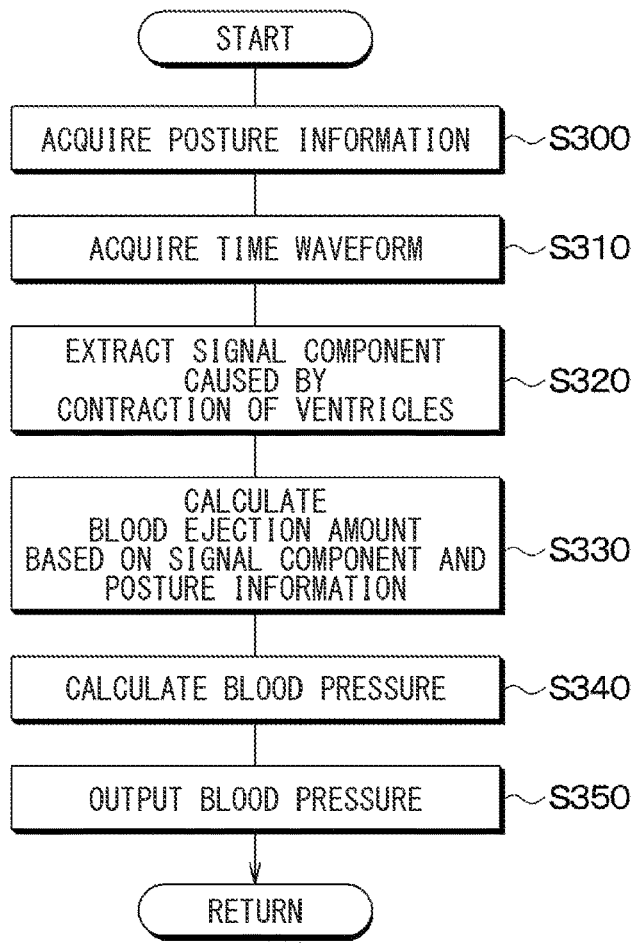
FIG. 11 is a flowchart showing a flow of a control process executed by an information controller of a biological information detector according to a third embodiment.

As shown in FIG. 11, in step S300, the processing unit 24 acquires information (that is, posture information) regarding the posture of the occupant P who is an object person. More specifically, the processing unit 24 acquires the posture information detected by the in-vehicle detection device 50 via the CAN bus 30.

In step S310, the processing unit 24 acquires, via a receiver 14, a time waveform of the reception signal received by the reception antenna 13 when the radio wave is transmitted from the transmission antenna 12. Then, in step S320, the processing unit 24 extracts a signal component caused by contraction of the ventricles from the received signal. More specifically, the processing unit 24 extracts a largest change amount ΔA from changes in the signal strength of the reception signal in a predetermined period as a characteristic change amount.

Subsequently, in step S330, the processing unit 24 calculates a blood ejection amount based on the largest change amount ΔA and the posture information. The processing unit 24 of the present embodiment calculates the blood ejection amount based on the largest change amount ΔA extracted in step S320 with reference to a control map or a relational expression that defines a relationship between the largest change amount ΔA and the blood ejection amount for each posture of the object person. More specifically, the control map or the relational expression corresponding to the posture of the object person is specified, and the blood ejection amount is calculated based on the largest change amount ΔA with reference to the specified control map or relational expression.

Subsequently, in step S340, the processing unit 24 calculates the blood pressure of the object person based on the blood ejection amount. Then, in step S350, the processing unit 24 outputs the blood pressure calculated in step S340 from an output unit 23 to a device outside the biological information detector 1.

Others are the same as those in the first embodiment. The biological information detector 1 of the present embodiment can achieve effects obtained from the common configuration or the equivalent configuration to the first embodiment.

(1) When the posture of the object person changes, the radio waves transmitted through the object person and the diffracted waves propagating around the object person by diffraction change, and thus the radio waves received by the reception antenna 13 changes. Therefore, the processing unit 24 may calculate the blood pressure of the object person based on the received signal and the posture of the object person.

Modification of Third Embodiment

The processing unit 24 of the third embodiment acquires the posture information including the posture of the object person based on the in-vehicle detection device 50, but is not limited to the in-vehicle detection device 50, and may acquire information regarding the posture of the object person from another device, for example, a sensor device or the like.

The processing unit 24 of the third embodiment calculates the blood ejection amount based on the largest change amount ΔA with reference to a control map or a relational expression that defines a relationship between the largest change amount ΔA and the blood ejection amount for each posture of the object person, but the processing unit 24 is not limited this method. For example, the processing unit 24 may correct the largest change amount ΔA according to the posture of the object person.

Other Embodiments

Although the representative embodiments of the present disclosure have been described above, the present disclosure is not limited to the above embodiments, and can be variously modified, for example, as follows.

In the above-described embodiments, the characteristic change amount of the change in the signal strength of the reception signal in the predetermined period is extracted as the component caused by the contraction of the ventricles of the heart H, and the blood ejection amount is calculated based on the component. However, the biological information detector 1 is not limited to this method for calculating the blood ejection amount. A biological information detector 1 may calculate the blood ejection amount or the blood pressure based on the received signal by another method.

In the above-described embodiments, the blood ejection amount or the blood pressure is calculated based on the largest change amount ΔA of the signal strength of the reception signal in the predetermined period, but a calculation method is not limited this method. For example, a biological information detector 1 may extract feature points included in signal strength of a reception signal in a predetermined period and calculate the blood ejection amount or the blood pressure based on the feature points.

In the above-described embodiments, the reception antenna 13 is attached to the seats S. However, the reception antenna 13 is not limited this attached position, and the reception antenna 13 may be attached to an object other than the seats S.

In the above-described embodiments, the transmission antenna 12 and the reception antenna 13 are arranged in a front-rear direction of the vehicle V with the occupant P interposed therebetween. However, the biological information detector 1 is not limited this arrangement. In a biological information detector 1, for example, a transmission antenna 12 and a reception antenna 13 may be arranged in a left-right detection of a vehicle V with an occupant P interposed therebetween. A biological information detector 1 may calculate biological information of not only a driver but also other occupants P. A biological information detector 1 may be used not only for a purpose of calculating biological information of an occupant P of the vehicle V but also for a purpose of calculating the biological information of a person outside the vehicle V (for example, an interior of a building).

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the above embodiments, when a shape, a positional relationship, or the like of the component or the like is mentioned, the shape, the positional relationship, or the like is not limited to that being mentioned unless otherwise specified or limited to a specified shape, a specified positional relationship, or the like in principle.

In the above-described embodiment, when it is described that external environment information of the vehicle V is acquired from a sensor, the sensor may be abolished and the external environment information may be received from a server or a cloud outside the vehicle. Alternatively, it is also possible to eliminate the sensor, acquire related information related to the external environmental information from a server or a cloud outside the vehicle, and estimate the external environmental information based on the acquired related information.

A controller and a method described in the present disclosure may be implemented by a special purpose computer, which includes a memory and a processor programmed to execute one or more special functions implemented by computer programs of the memory. A controller and a method described in the present disclosure may be implemented by a special purpose computer including a processor with one or more dedicated hardware logic circuits. A controller and a method described in the present disclosure may be implemented by a combination of (i) a special purpose computer including a processor programmed to execute one or more functions by executing a computer program and a memory and (ii) a special purpose computer including a processor with one or more dedicated hardware logic circuits. A computer program may be stored in a computer-readable non-transitory tangible recording medium as an instruction executed by a computer.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A biological information detector for detecting biological information of an object person seated in a vehicle, comprising:
   a reception antenna configured to receive radio waves transmitted from a transmission antenna, through the object person, wherein the transmission antenna is located outside the object person; and
   a controller configured to:
      acquire a reception signal corresponding to a radio wave received by the reception antenna when the radio waves are transmitted from the transmission antenna;
      extract a signal component generated due to movement of a heart of the object person based on the received signal;
      calculate a blood pressure of the object person as the biological information based on the signal component; and
      output the blood pressure to a device that is located outside the controller and monitors the blood pressure of the object person; and
   performing a route guidance of the vehicle based on the blood pressure.

2. The biological information detector according to claim 1, wherein
   the controller is configured to extract a characteristic change amount from signal strength of the reception signal that changes over time in a predetermined period, as a component caused by contraction of ventricles of the heart, and calculate a blood ejection amount delivered from the heart to a whole body based on the component.

3. The biological information detector according to claim 2, wherein
   the characteristic change amount is a largest change amount of the signal strength of the reception signal in the predetermined period, and
   the largest change amount is a difference in signal strength between a minimum value and a maximum value in the predetermined period.

4. The biological information detector according to claim 2, wherein
   the controller is configured to calculate a second blood pressure based on the blood ejection amount.

5. The biological information detector according to claim 1, wherein
   the reception antenna is provided in the seat, and
   the controller is configured to calculate the blood pressure of the object person based on the signal component and a position of the seat in the vehicle.

6. The biological information detector according to claim 1, wherein
   the controller is configured to calculate the blood pressure of the object person based on the signal component and posture of the object person.

7. A biological information detector for detecting biological information of an object person that is an occupant seated in a seat of a vehicle, comprising:
   a reception antenna configured to receive radio waves transmitted from a transmission antenna, through the object person, wherein the transmission antenna is located outside the object person; and a controller configured to:
acquire a reception signal corresponding to a radio wave received by the reception antenna when the radio waves are transmitted from the transmission antenna;
extract a signal component generated due to movement of a heart of the object person based on the received signal;
calculate a blood pressure of the object person as the biological information based on the signal component; and
output the blood pressure to a device that is located outside the controller and monitors the blood pressure of the occupant, wherein
the device is an in-vehicle device mounted on the vehicle or a mobile communication terminal carried by the occupant, and
performing a route guidance of the vehicle based on the blood pressure.

* * * * *